(12) United States Patent
Machida

(10) Patent No.: US 11,931,840 B2
(45) Date of Patent: Mar. 19, 2024

(54) DUST COLLECTION CUP AND POWER TOOL

(71) Applicant: MAKITA CORPORATION, Anjo (JP)

(72) Inventor: Yoshitaka Machida, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/994,503

(22) Filed: Nov. 28, 2022

(65) Prior Publication Data

US 2023/0241737 A1    Aug. 3, 2023

(30) Foreign Application Priority Data

Jan. 28, 2022 (JP) ................... 2022-012210

(51) Int. Cl.
*B23Q 11/00* (2006.01)

(52) U.S. Cl.
CPC ................ *B23Q 11/0071* (2013.01)

(58) Field of Classification Search
CPC ............ B23B 2270/62; B23Q 11/0046; B23Q 11/0071
See application file for complete search history.

(56) References Cited

U.S. PATENT DOCUMENTS

| | | | | |
|---|---|---|---|---|
| 2,246,916 A | * | 6/1941 | Fischer | B23Q 11/0046 408/58 |
| 4,921,375 A | * | 5/1990 | Famulari | B23Q 11/0046 29/DIG. 83 |
| 5,292,210 A | * | 3/1994 | Nowick | B23Q 11/0053 408/67 |
| 5,688,082 A | * | 11/1997 | Richardson | B23Q 16/001 409/137 |
| 6,079,078 A | * | 6/2000 | Byington | B23Q 11/0866 83/100 |
| 7,797,794 B2 | * | 9/2010 | Bleicher | B08B 15/04 15/415.1 |
| 8,409,310 B2 | * | 4/2013 | Despineux | B23Q 11/0046 55/385.1 |
| 8,636,084 B2 | * | 1/2014 | Ohlendorf | B25F 3/00 173/198 |

(Continued)

FOREIGN PATENT DOCUMENTS

JP         5575428 B2     8/2014

*Primary Examiner* — Thanh K Truong
*Assistant Examiner* — David G Shutty
(74) *Attorney, Agent, or Firm* — Oliff PLC

(57) ABSTRACT

A dust collection cup includes a cylindrical attachment to cause a bit to extend through the attachment, a cylindrical dust collector located in front of the attachment to cause the bit to extend through the dust collector, a seal between the attachment and the dust collector and having a through-hole to receive the bit, and a connection port connectable to a dust collection hose and located on an outer circumferential surface of the attachment outward in a radial direction of the bit from the seal and rearward from the seal. The connection port has a distance in the radial direction of the bit from an axis of the attachment to an outermost position longer than a distance in the radial direction of the bit from the axis to a position on the outer circumferential surface of the attachment that is opposite to the outermost position from the axis.

11 Claims, 13 Drawing Sheets

(56) References Cited

U.S. PATENT DOCUMENTS

| | | | | |
|---|---|---|---|---|
| 8,967,922 | B2* | 3/2015 | Yoshikane | B23Q 11/0046 408/67 |
| 8,978,781 | B2* | 3/2015 | Burdick | B23Q 11/0046 173/198 |
| 9,579,762 | B2* | 2/2017 | Sullivan | B23Q 11/0046 |
| 9,956,659 | B2* | 5/2018 | Takeuchi | B23Q 11/0046 |
| 9,969,043 | B2* | 5/2018 | Bergman | B23Q 11/0071 |
| 10,238,252 | B2* | 3/2019 | Buczek | A47L 7/0095 |
| 10,780,541 | B2* | 9/2020 | Arthur | B25D 17/20 |
| 11,648,635 | B2* | 5/2023 | Peterson | B23Q 11/0046 408/67 |
| 11,732,829 | B1* | 8/2023 | Angel | F16L 37/107 285/86 |
| 2011/0008118 | A1 | 1/2011 | Yoshikane et al. | |

* cited by examiner

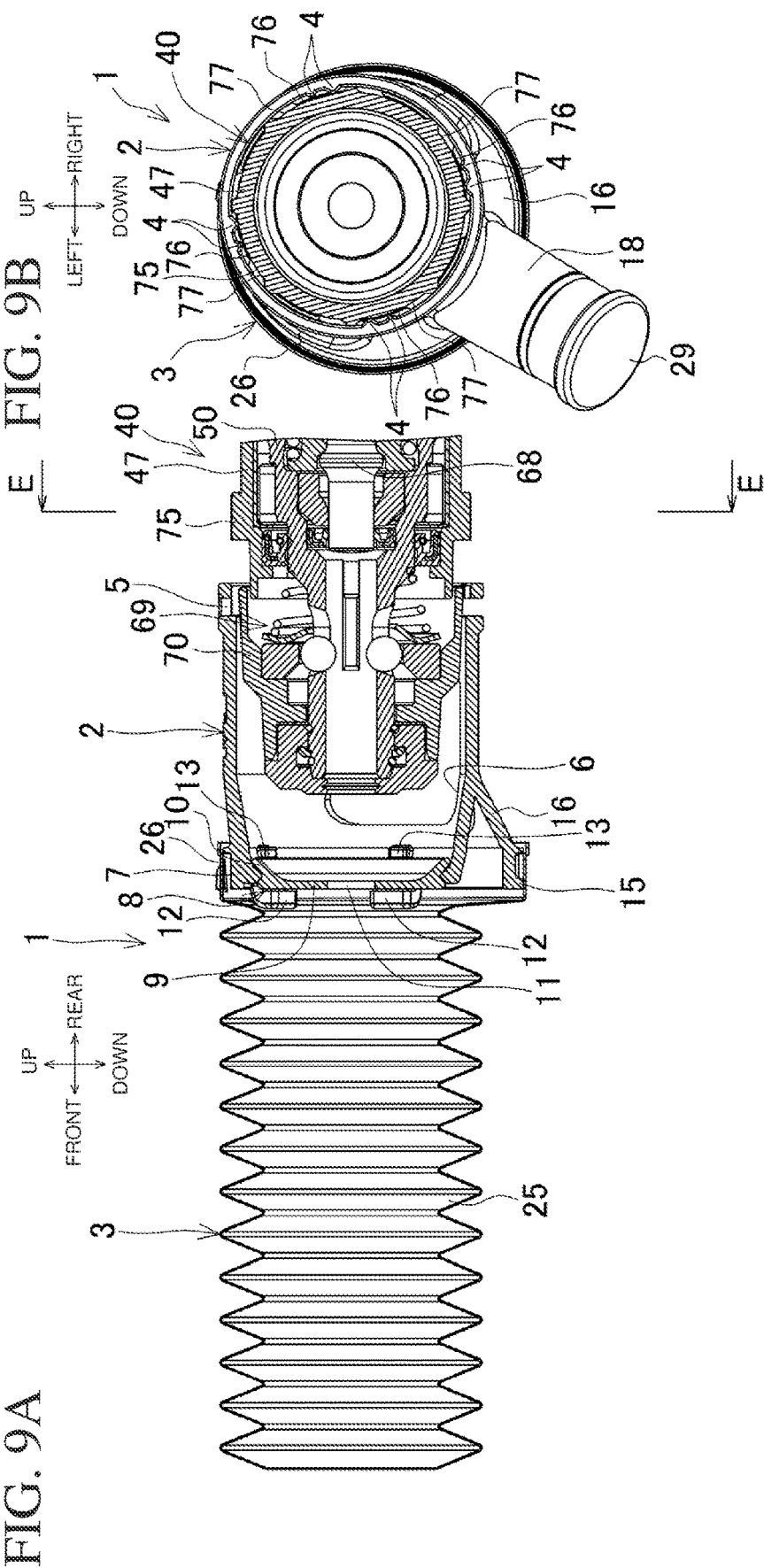

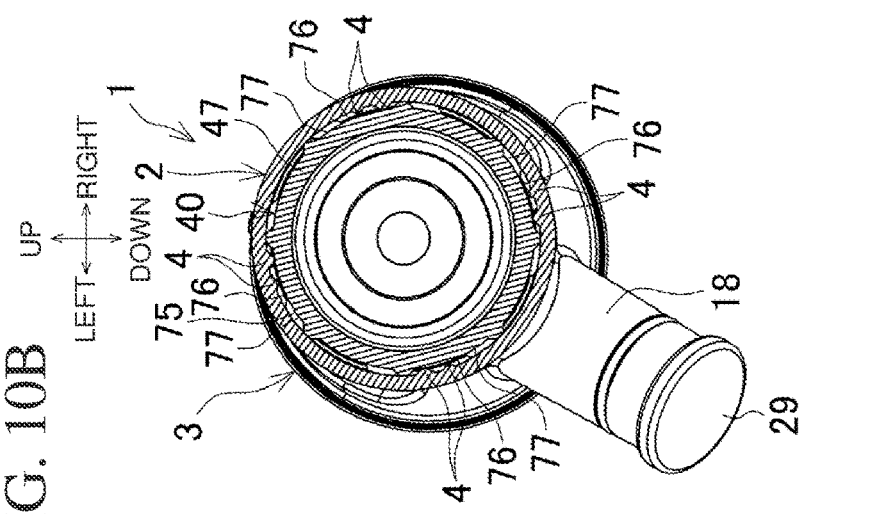
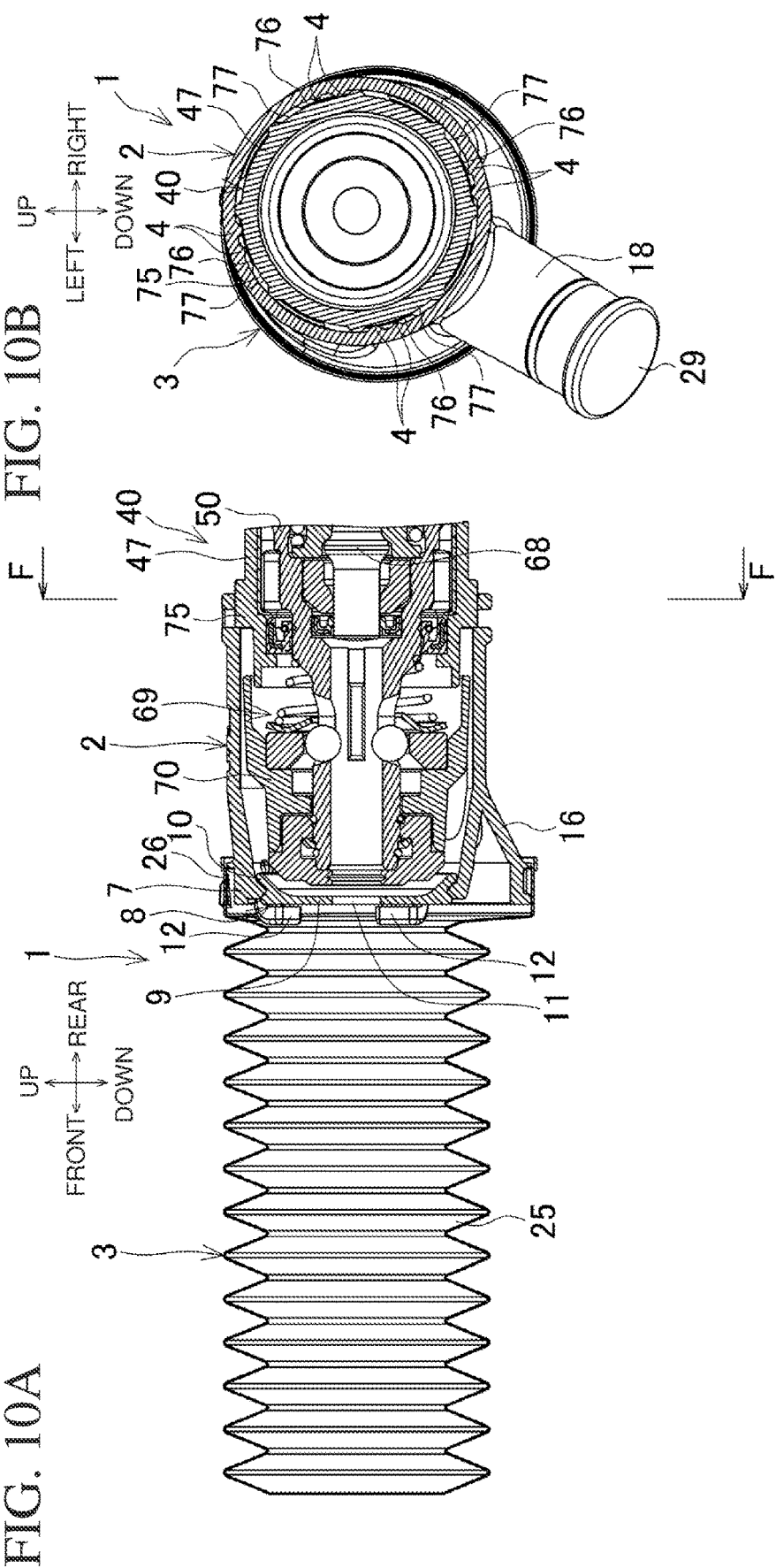

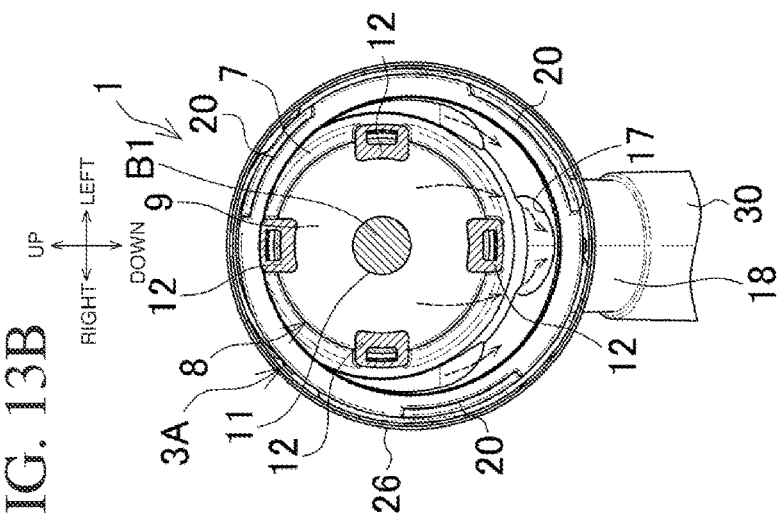
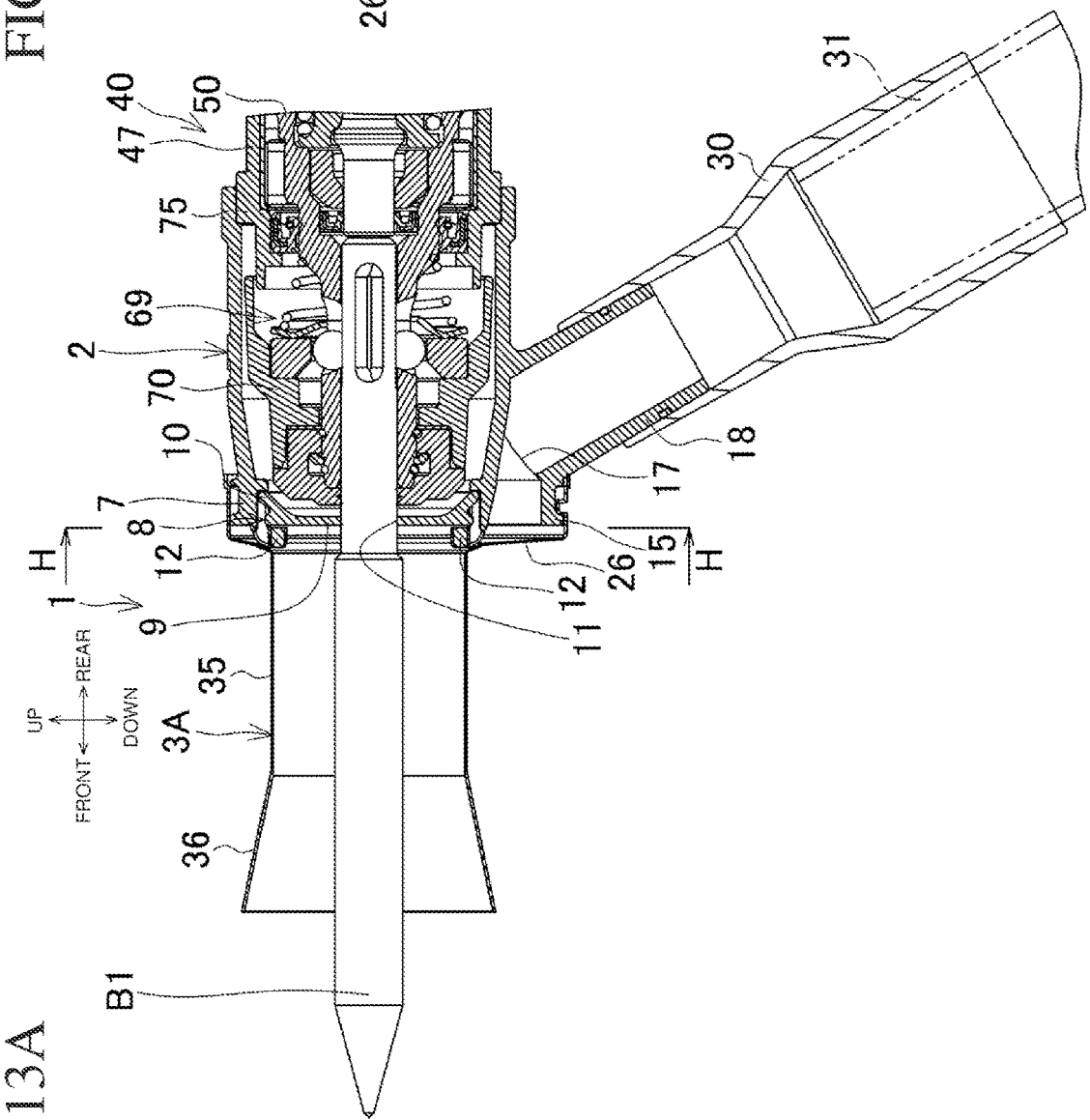
FIG. 13A
FIG. 13B

DUST COLLECTION CUP AND POWER TOOL

CROSS-REFERENCE TO RELATED APPLICATIONS

This application claims the benefit of priority to Japanese Patent Application No. 2022-012210, filed on Jan. 28, 2022, the entire contents of which are hereby incorporated by reference.

BACKGROUND

1. Technical Field

The present disclosure relates to a dust collection cup attachable to a power tool such as a hammer drill for dust collection, and to a power tool with the dust collection cup.

2. Description of the Background

For a power tool, such as a hammer drill, used for an operation such as drilling with a rotating bit attached to its distal end, a dust collection cup is attached to the distal end of the power tool to prevent diffusion of dust that is produced from a workpiece. A dust collection cup described in, for example, Japanese Patent No. 5575428, includes a cylindrical attachment attached to a distal end of a power tool, and a bellows-like dust collector attached to the front of the attachment to cover a bit. The attachment includes a connection port connectable to a flexible hose for, for example, an external dust collection device.

BRIEF SUMMARY

A known dust collection cup includes a seal between an attachment and a dust collector to seal between them except a through-hole for a bit. The attachment includes a larger-diameter holder including a connection port located outward in the radial direction from the seal and rearward from the seal. The dust collector is coaxially attached to the holder. The dust collector thus has a larger outer diameter than the attachment, upsizing the dust collection cup and lowering viewability during operation.

One or more aspects of the present disclosure are directed to a dust collection cup including a connection port and a power tool that can downsize a dust collector and can improve viewability.

A first aspect of the present disclosure provides a dust collection cup, including:

an attachment being cylindrical and attachable to a power tool, the attachment being attached to cause a bit attached to the power tool to extend through the attachment;

a dust collector being cylindrical and located in front of the attachment to cause the bit to extend through the dust collector;

a seal between the attachment and the dust collector, the seal having a through-hole to receive the bit; and a connection port on an outer circumferential surface of the attachment, the connection port being outward in a radial direction of the bit from the seal and rearward from the seal, the connection port being connectable to a dust collection hose, the connection port having a distance in the radial direction of the bit from an axis of the attachment to an outermost position of the connection port longer than a distance in the radial direction of the bit from the axis to a position on the outer circumferential surface of the attachment, the position on the outer circumferential surface being opposite to the outermost position from the axis.

A second aspect of the present disclosure provides a power tool, including:

a bit; and the dust collection cup being attachable to a front end to receive the bit.

The dust collection cup including the connection port and the power tool according to the above aspects of the present disclosure can downsize the dust collector and can improve viewability.

BRIEF DESCRIPTION OF DRAWINGS

FIG. 9A is an enlarged longitudinal central sectional view of the hammer drill, showing its front portion to which the dust collection cup is attached.

FIG. 9B is a cross-sectional view taken along line E-E in FIG. 9A.

FIG. 10A is an enlarged longitudinal central sectional view of the hammer drill, showing its front portion with the dust collection cup attached.

FIG. 10B is a cross-sectional view taken along line F-F in FIG. 10A.

FIG. 13A is an enlarged longitudinal central sectional view of the hammer drill, showing its front portion with the dust collection cup according to the modification.

FIG. 13B is a cross-sectional view taken along line H-H in FIG. 13A.

DETAILED DESCRIPTION

Embodiments

Embodiments of the present disclosure will now be described with reference to the drawings.

Figure 1:
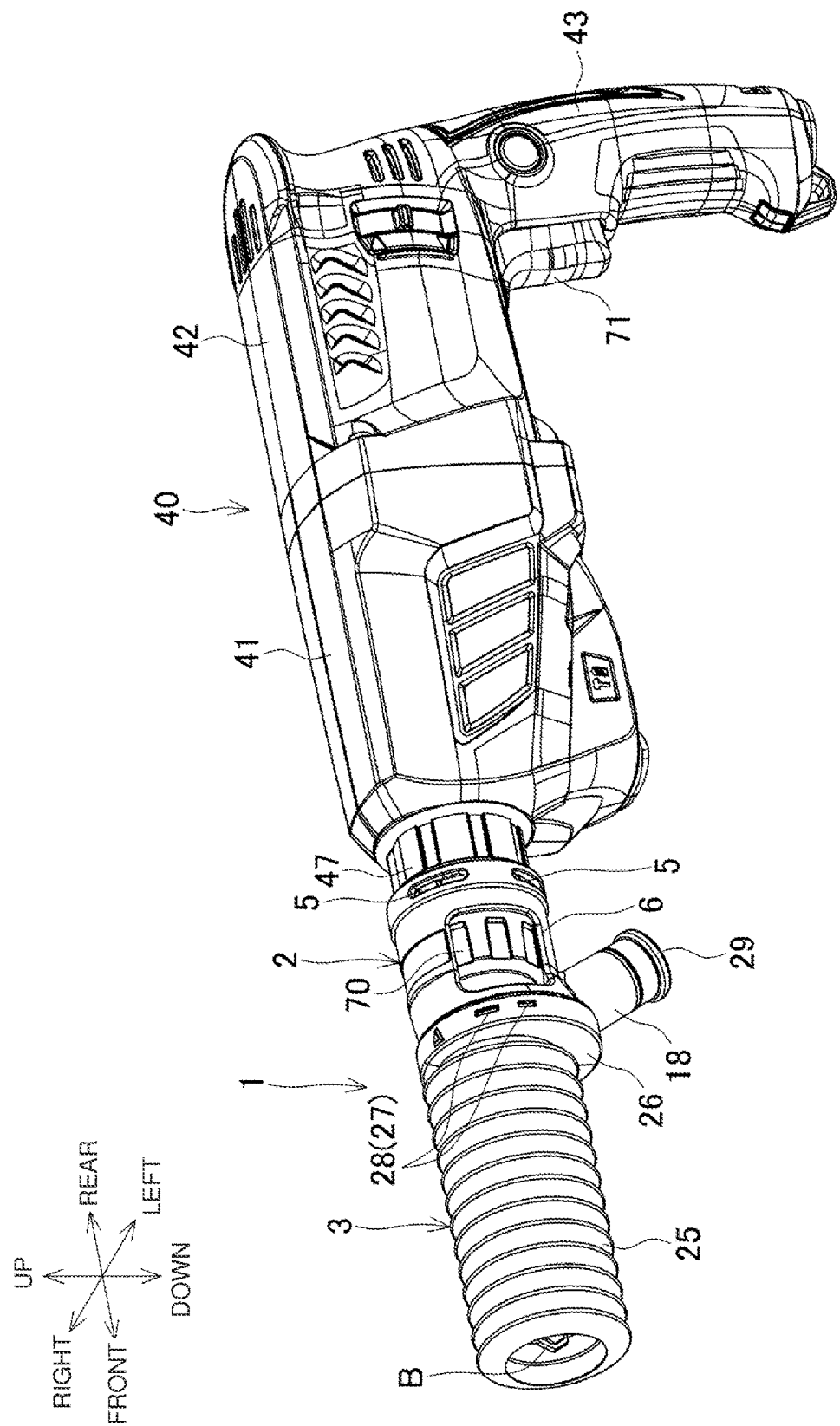
FIG. 1 is a perspective view of a hammer drill with a dust collection cup.
Figure 2:
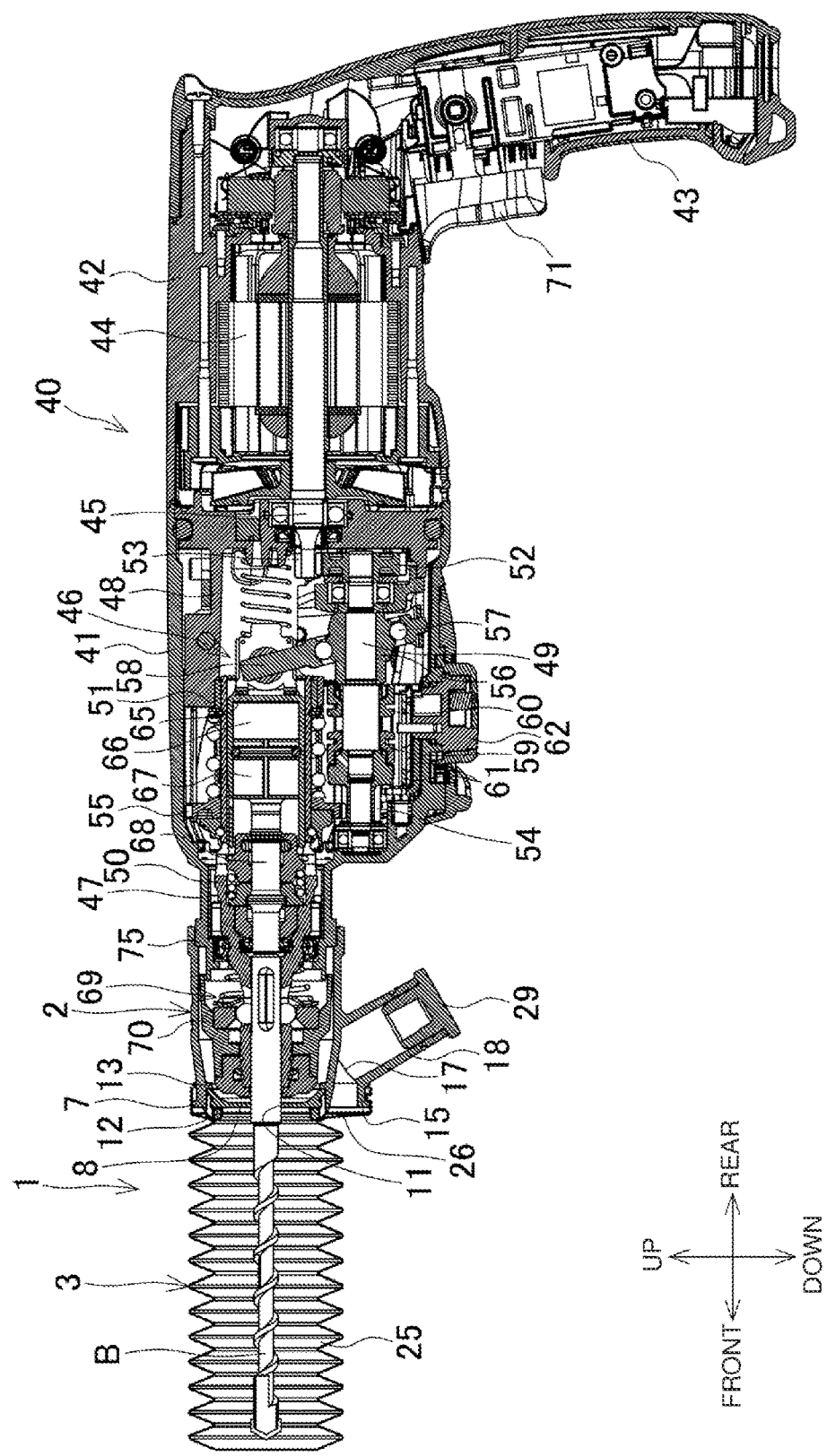
FIG. 2 is a longitudinal central sectional view of the hammer drill with the dust collection cup.
Figures 3A, 3B:
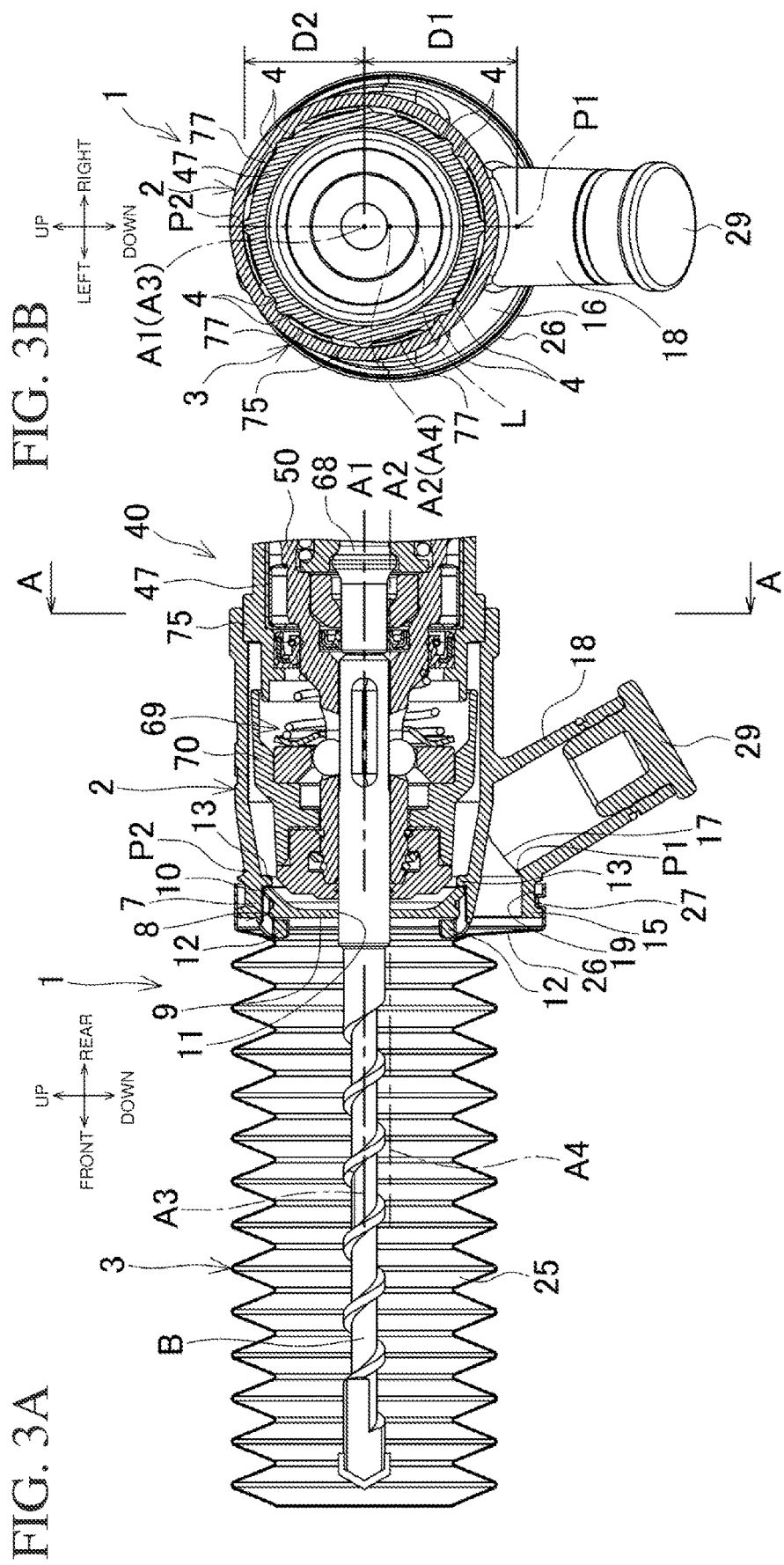
FIG. 3A is an enlarged view of a front portion in FIG. 2.
FIG. 3B is a cross-sectional view taken along line A-A in FIG. 3A.

FIG. 1 is a perspective view of an example dust collection cup and a hammer drill as an example of a power tool with the dust collection cup. FIG. 2 is a longitudinal central sectional view of the hammer drill with the dust collection cup. FIG. 3A is an enlarged view of a front portion in FIG. 2. FIG. 3B is a cross-sectional view taken along line A-A in FIG. 3A.

A dust collection cup 1 includes an attachment 2 at the rear and a dust collector 3 at the front. The attachment 2 is a resin cylinder. The attachment 2 is attached to a front cylinder 47 in a hammer drill 40. The dust collector 3 is a cylinder formed from a resin that is thinner than the attachment 2. The dust collector 3 is connected to the front end of the attachment 2.

Figure 4:
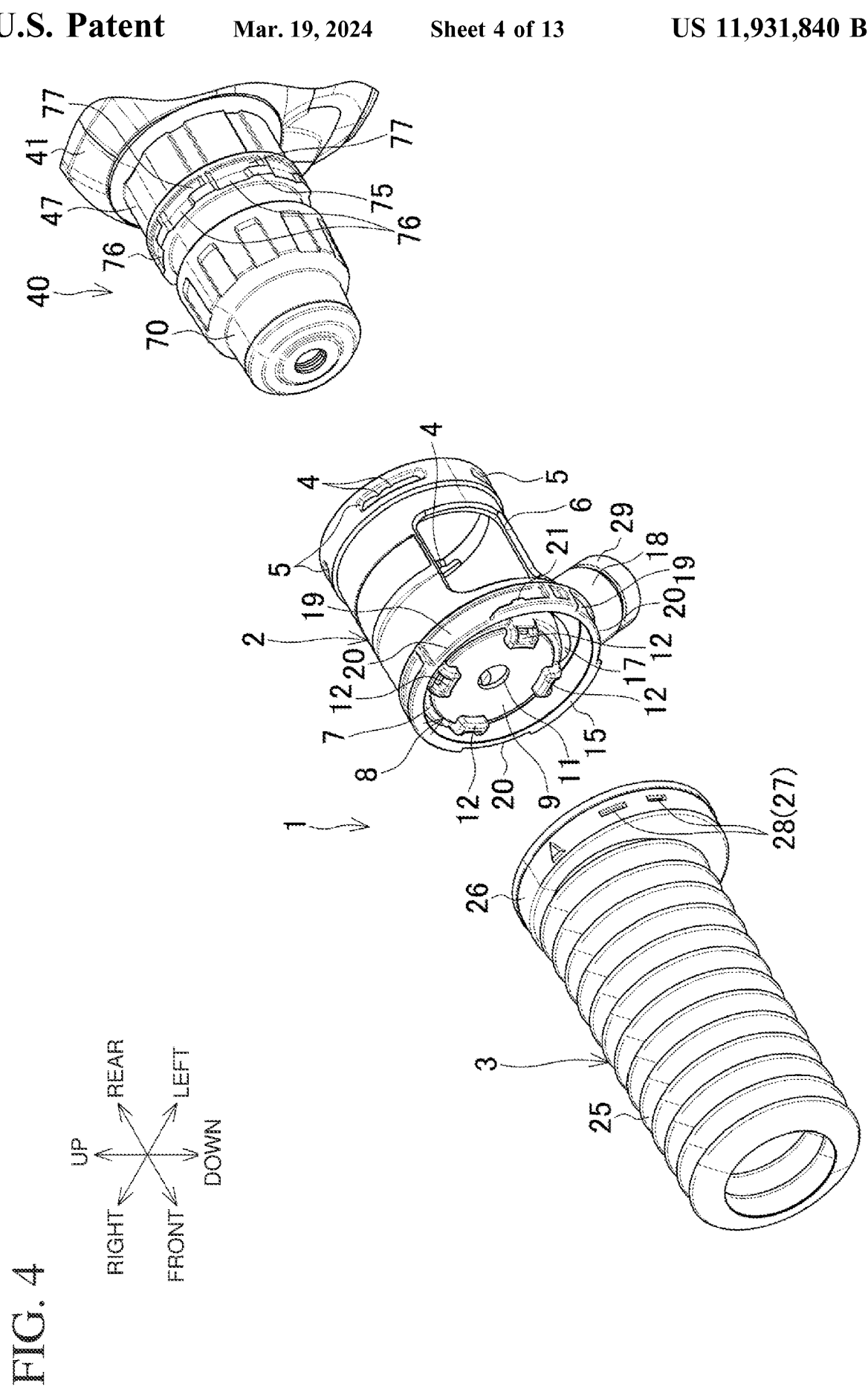
FIG. 4 is an exploded perspective view of the dust collection cup as viewed from the front.
Figure 5:
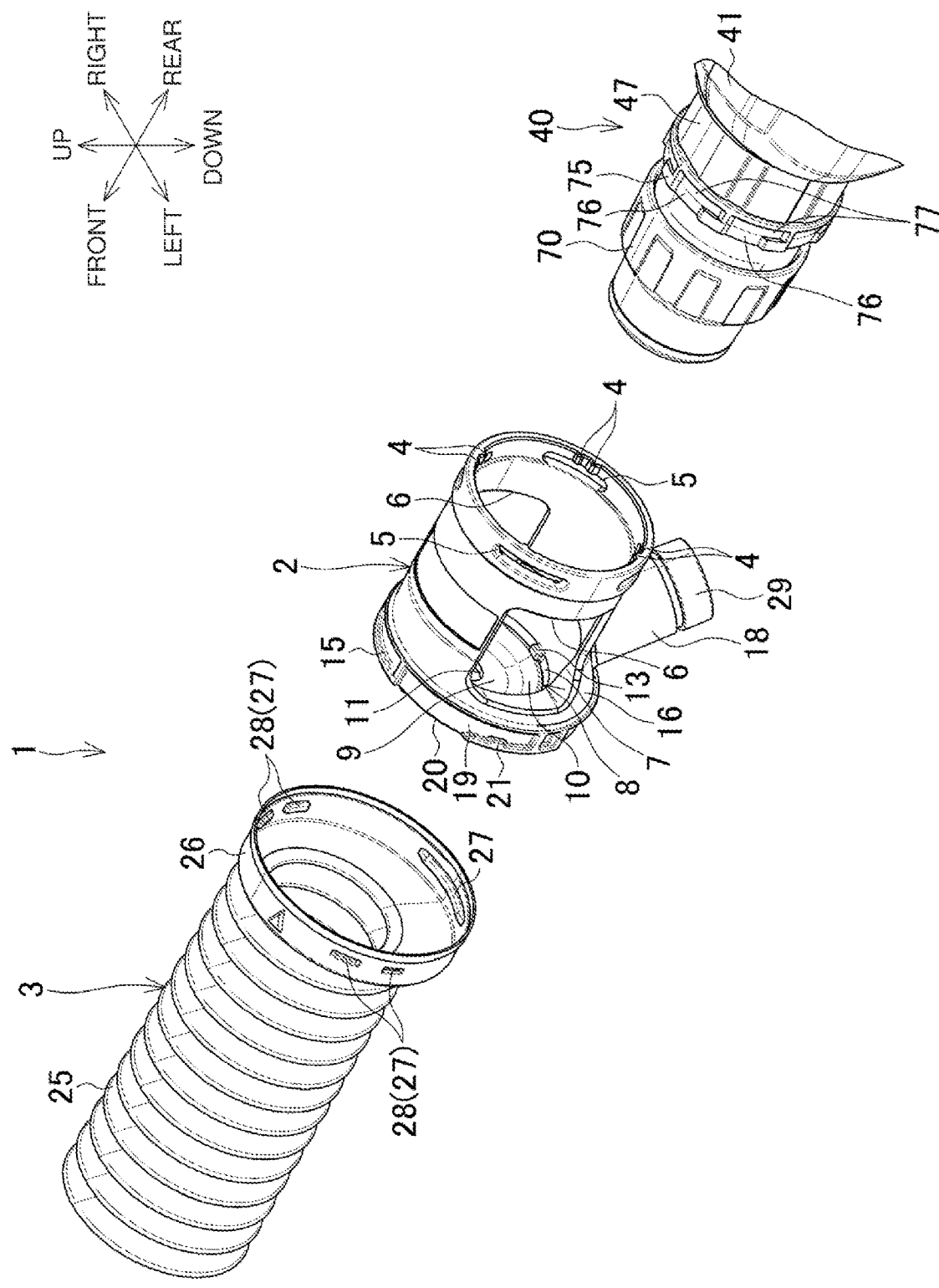
FIG. 5 is an exploded perspective view of the dust collection cup as viewed from the rear.

As shown in FIGS. 4 and 5, the attachment 2 includes, on its inner circumference at the rear end, four pairs of protrusions 4 protruding toward the center and arranged at equal intervals in the circumferential direction. The attachment 2 has, in its rear end, four long holes 5 in front of the protrusions 4. Each long hole 5 is elongated in the circumferential direction. The attachment 2 includes, on its circumferential surface, a pair of windows 6 in front of the long holes 5.

The attachment 2 has, in its front portion, a front end 7 tapered frontward. The front end 7 includes a seal plate 8. The seal plate 8 includes a disk 9 and a sloped portion 10. The disk 9 is fitted in an opening of the front end 7. The disk 9 is circular as viewed from the front. The disk 9 has a circular through-hole 11 at the center. A bit B extends through the through-hole 11. The sloped portion 10 has a diameter increasing rearward from the outer circumference of the rear surface of the disk 9. The front end 7 includes four front receivers 12 at equal intervals in the circumferential direction. Each front receiver 12 protrudes frontward from the front surface of the front end 7, and then protrudes toward the center of the front end 7 to be in contact with or adjacent to the front surface of the disk 9. The attachment 2 includes, on its inner circumference and behind the front receivers 12, four rear receivers 13 at the same circumferential positions as the front receivers 12. Each rear receiver 13 protrudes toward the center of the attachment 2 to be in contact with the rear end of the sloped portion 10. The seal plate 8 is thus positioned at the front end of the attachment 2, and seals the opening of the front end 7 except the through-hole 11.

Figure 6B:
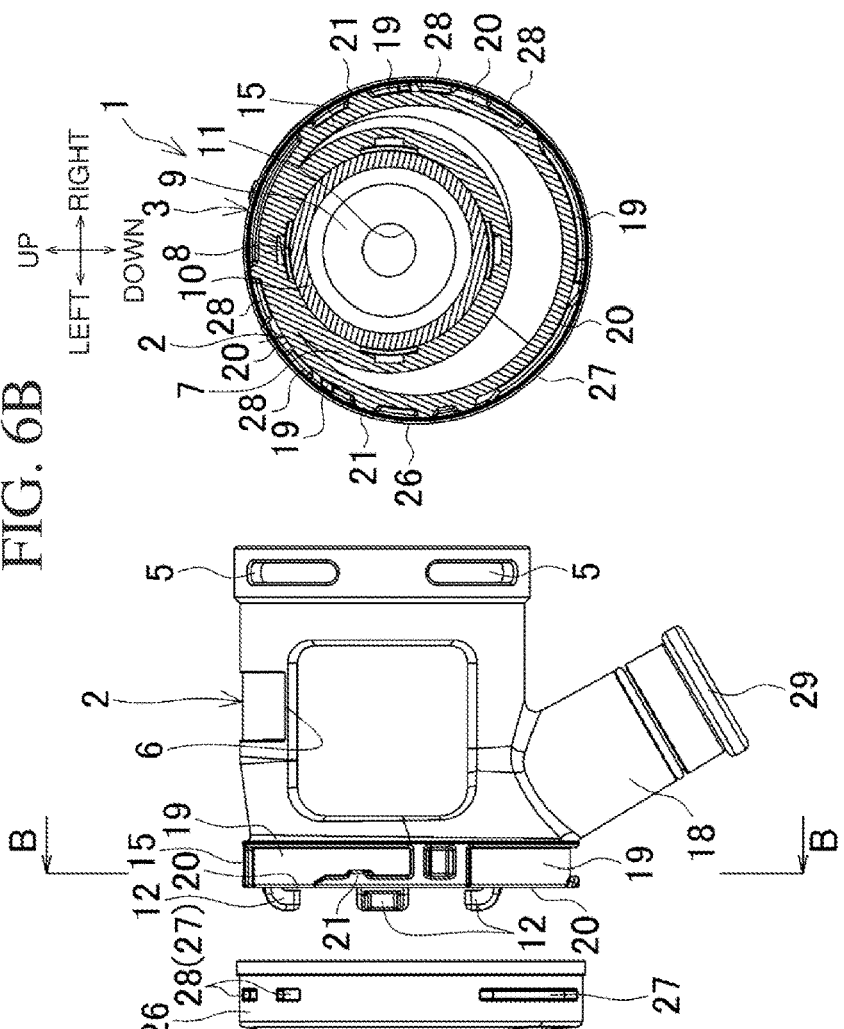
FIG. 6B is a cross-sectional view taken along line B-B in FIG. 6A.
Figure 6A:
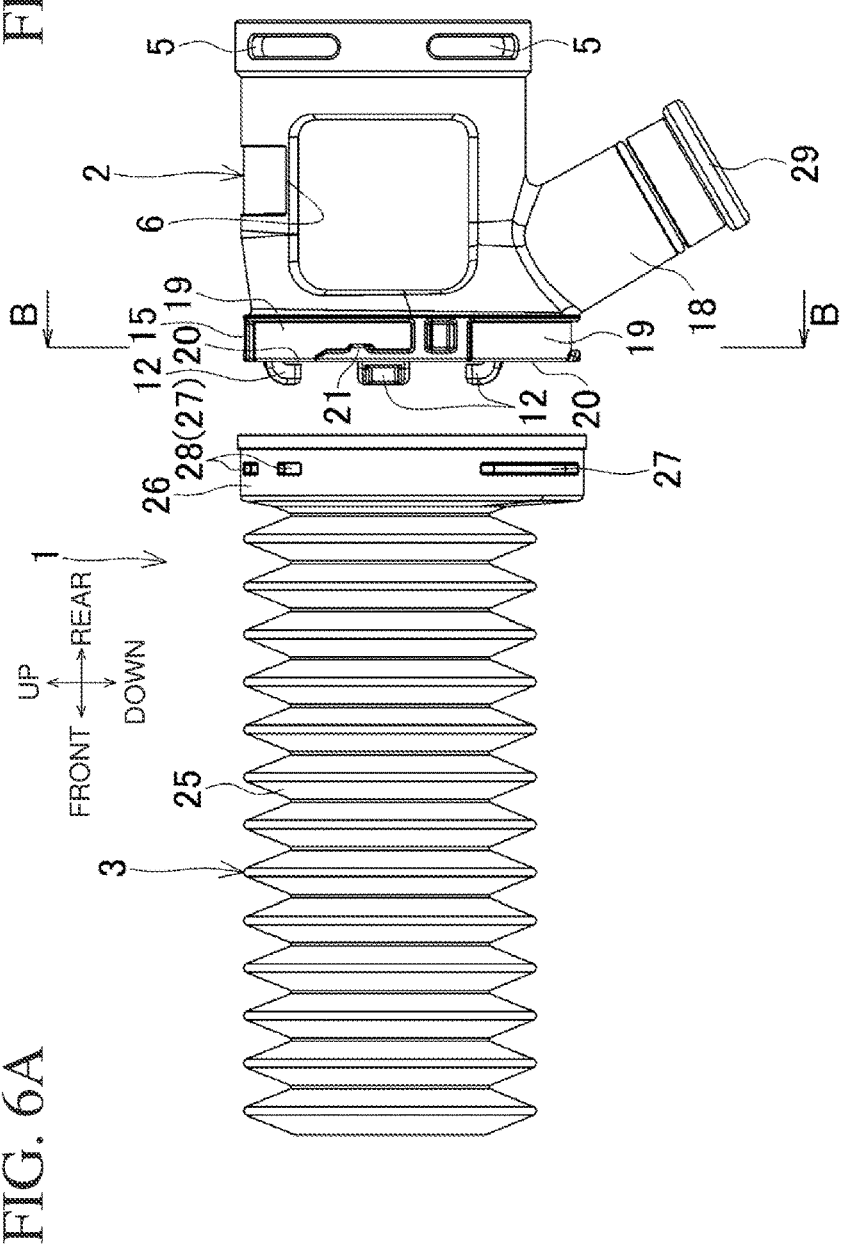
FIG. 6A is a side view of an attachment and a dust collector separate from each other.

The attachment 2 is integral with, in its front portion, a holder 15 for the dust collector 3. The holder 15 is a circular ring having a larger diameter than the front end 7. The holder 15 has an axis A2 decentered from an axis A1 of the attachment 2 in the radial direction of the attachment 2 (the radial direction of the bit B). As shown in FIGS. 6A and 6B, the front end 7 thus partially overlaps the holder 15. A sealing portion 16 is located behind the holder 15. The sealing portion 16 has a connection port 17. The connection port 17 is open diagonally rearward with respect to the axis A2 of the holder 15. As shown in FIGS. 3A and 3B, the connection port 17 has, as its outermost position in the radial direction of the bit B, a point P1 on a straight line L extending in the radial direction in which the holder 15 is decentered from the axis A1 as viewed from the front. In the direction of the straight line L, the connection port 17 has a distance D1 from the axis A1 of the attachment 2 to the point P1 longer than a distance D2 from the axis A1 to a point P2 on the outer surface of the attachment 2 and opposite to the point P1 across the axis A1. The sealing portion 16 includes a cylindrical portion 18. The cylindrical portion 18 is coaxial with the connection port 17 and protrudes diagonally rearward from the connection port 17.

The holder 15 has three engaging recesses 19 on its outer circumferential surface. The three engaging recesses 19 are arranged at equal intervals in the circumferential direction of the holder 15. Each engaging recess 19 is elongated along the outer circumferential surface of the holder 15. At the front end of the holder 15, each engaging recess 19 includes a cutout 20 located in its substantially half area in the counterclockwise rotation direction as viewed from the front. The half area located in the counterclockwise rotation direction in each engaging recess 19 is open at the front end of the holder 15 through the cutout 20. Two engaging recesses 19 each include an inner protrusion 21 on its front inner side surface adjacent to the cutout 20 in the circumferential direction. Each inner protrusion 21 protrudes rearward.

The dust collector 3 includes a bellows 25 and a cap 26. The bellows 25 has its crests having a slightly larger diameter than a rear portion of the attachment 2. The bellows extends in the front-rear direction. The cap 26 has a larger diameter than the bellows 25. The cap 26 has its front surface connected to the rear end of the bellows 25. The cap 26 is open rearward. As shown in FIG. 3A, the cap 26 has an axis A4 decentered from an axis A3 of the bellows 25 in the radial direction of the bit B. The axis A4 of the cap 26 and the axis A3 of the bellows 25 are decentered from each other by the same amount as the amount by which the axis A1 of the attachment 2 and the axis A2 of the holder 15 are decentered from each other.

The cap 26 has an inner diameter slightly larger than the outer diameter of the holder 15 in the attachment 2. The holder 15 receives the cap 26 covering it from the front. Three ridges 27 are raised from the inner circumferential surface of the cap 26 toward the center. Each ridge 27 is elongated in the circumferential direction of the cap 26. Each ridge 27 is shorter than the corresponding cutout 20 in the holder 15 in the circumferential direction. The two ridges 27 each include outer protrusions 28 separate from each other in the circumferential direction. Each inner protrusion 21 in the corresponding engaging recess 19 on the holder 15 is engageable between the outer protrusions 28.

Figure 7A:
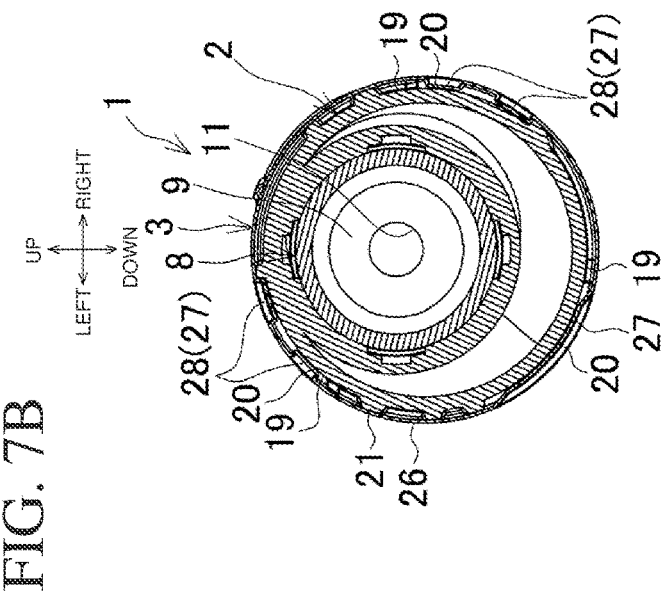
FIG. 7A is a side view of the attachment and the dust collector adjacent to each other.
Figure 7B:
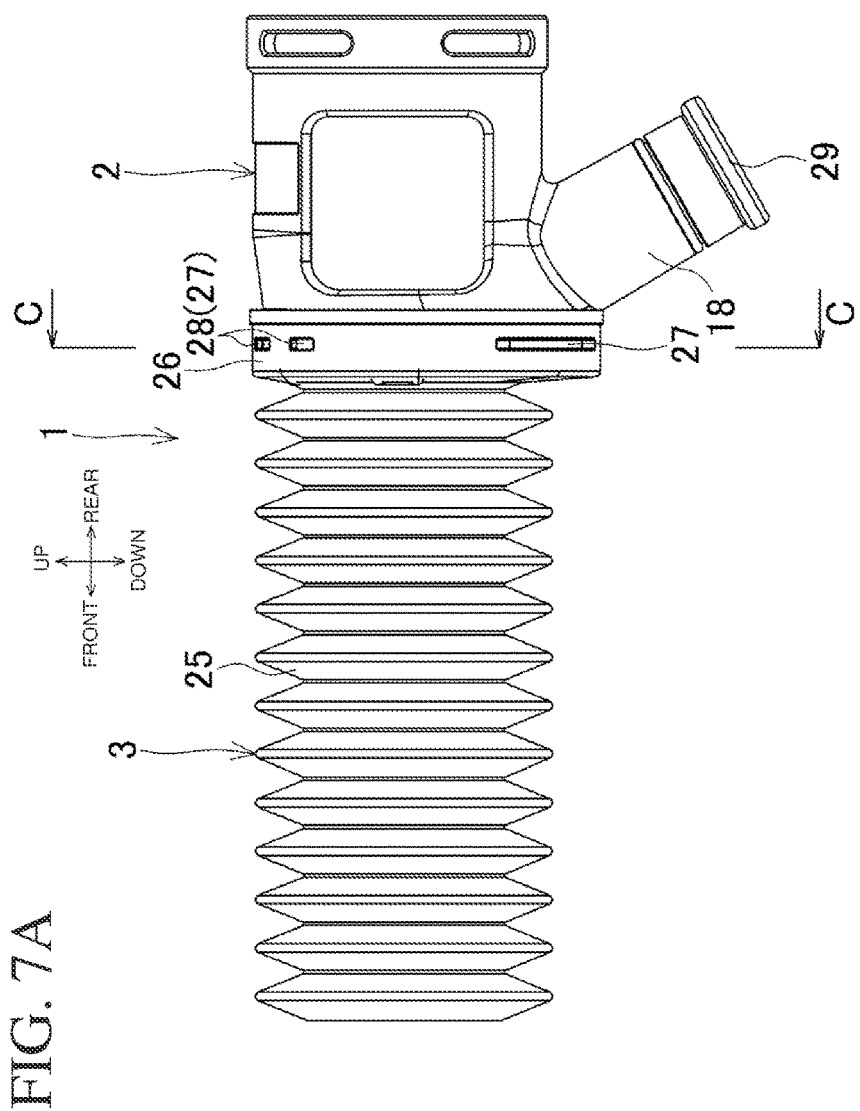
FIG. 7B is a cross-sectional view taken along line C-C in FIG. 7A.

To attach the dust collector 3 to the attachment 2, the two ridges 27 each including the outer protrusions 28 are first aligned in the circumferential direction with the two cutouts each including the inner protrusion 21 in the engaging recess 19 as shown in FIGS. 6A and 6B. With each ridge 27 placed in the corresponding engaging recess 19 through the cutout 20, the cap 26 is placed on the holder 15 as shown in FIGS. 7A and 7B.

Figure 8B:
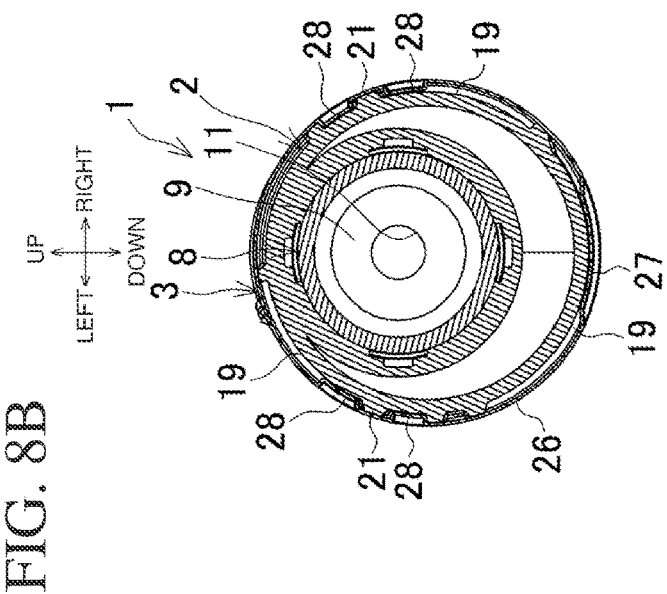
FIG. 8B is a cross-sectional view taken along line D-D in FIG. 8A.
Figure 8A:
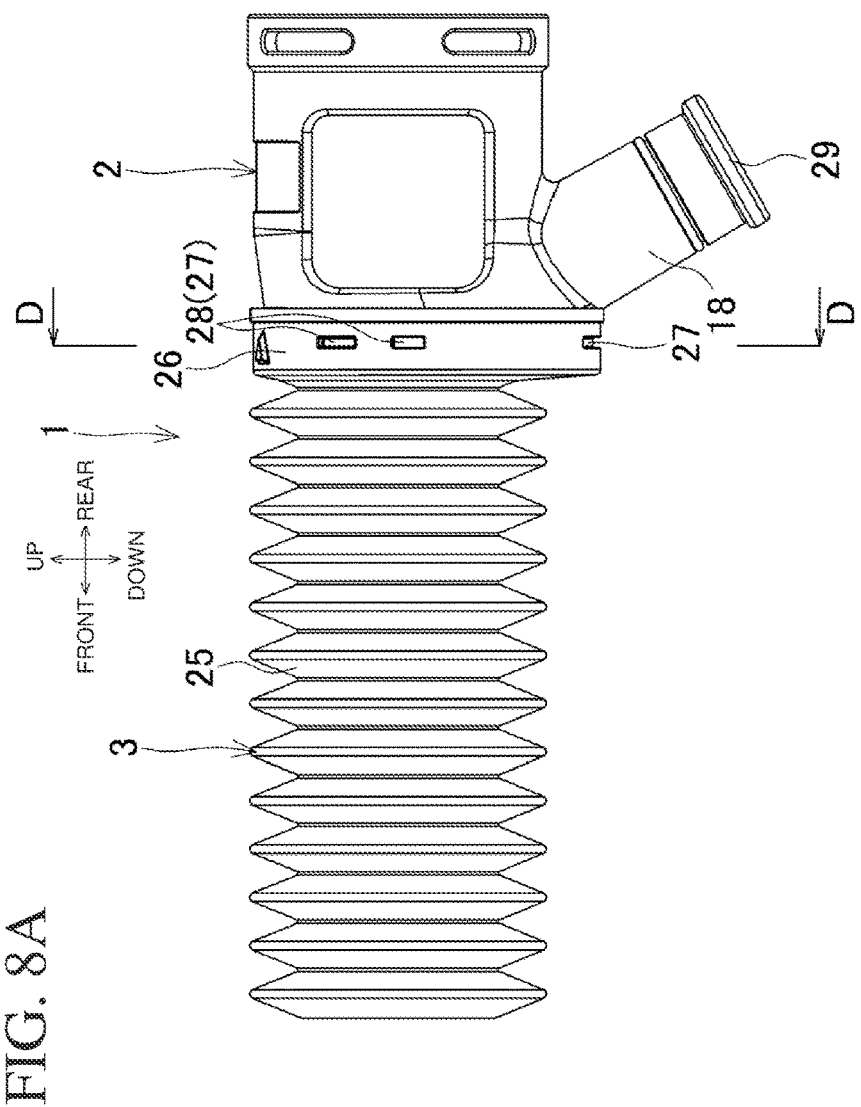
FIG. 8A is a side view of the attachment and the dust collector connected to each other.

The cap 26 is rotated clockwise as viewed from the front, or the attachment 2 is rotated counterclockwise as viewed from the front. As shown in FIGS. 8A and 8B, each ridge 27 then moves onto the front inner side surface of the corresponding engaging recess 19, and moves clockwise relative to the engaging recess 19 along the engaging recess 19 as viewed from the front. Each ridge 27 is then engaged with the front inner side surface of the corresponding engaging recess 19. The attachment 2 connected to the dust collector 3 with this bayonet connection is prevented from slipping off forward. The outer protrusions 28 on each of the two ridges 27 are engaged with the corresponding inner protrusion 21 in the corresponding one of the two engaging recesses 19. This also prevents rotation of the connected cap 26.

When the cap 26 is bayonet-connected to the holder 15, the bellows 25 decentered from the cap 26 rotates about the axis A4 of the cap 26. As shown in FIGS. 3A and 3B, the bellows 25 can thus extend until the axis A3 is aligned with the axis A1 of the attachment 2 (an axis of the bit B). The rear end opening of the bellows 25 in contact with the front receivers 12 restricts backward movement of the bellows 25. With the bellows 25 in contact with the front receivers 12, each ridge 27 moves onto the front inner side surface of the corresponding engaging recess 19, connecting the cap 26 to the holder 15. This pulls the attachment 2 forward to press the front receivers 12 against the cap 26. The attachment 2 and the dust collector 3 are thus urged against each other in the directions in which the attachment 2 and the dust collector 3 are connected to each other.

With the bayonet connection, the front receivers 12 define a clearance in the front-rear direction between the rear end opening of the bellows 25 and the front surface of the disk 9 in the seal plate 8. This clearance connects with an inner space between the holder 15 and the sealing portion 16 through spaces between the front receivers 12, and further with the cylindrical portion 18 through the connection port 17.

As shown in FIGS. 1 and 2, the hammer drill 40 includes a front housing 41 and a rear housing 42. The rear housing 42 includes a handle 43. The handle 43 is connected to a power cable (not shown). The rear housing 42 accommodates a motor 44 with an output shaft 45 facing frontward. The front housing 41 accommodates a rotation-striking assembly 46. The front housing 41 is joined to the front of the rear housing 42. The front housing 41 includes, at its front end, the front cylinder 47 protruding frontward.

The front housing 41 includes an inner housing 48 that axially supports the output shaft 45. A countershaft 49 parallel to the output shaft 45 is axially supported in a rotatable manner below the output shaft 45 and between the front inner surface of the front housing 41 and the front surface of a rear portion of the inner housing 48. The front housing 41 accommodates a cylindrical tool holder 50. The tool holder 50 extends in the front-rear direction. The tool holder 50 is axially supported in a rotatable manner between the front cylinder 47 and a receiving cylinder 51 located in a front portion of the inner housing 48. The countershaft 49 includes a first gear 52 at its rear end in a manner rotatable together with the countershaft 49. The first gear 52 meshes with a pinion 53 at the distal end of the output shaft 45. A second gear 54 is rotatable in front of the first gear 52 and at the front end of the countershaft 49. The second gear 54 meshes with a third gear 55 in the tool holder 50.

A boss sleeve 56 is rotatable in front of the first gear 52 on the countershaft 49. The boss sleeve 56 externally holds an arm 58 with a swash bearing 57 having its axis tilted. A front clutch 59 and a rear clutch 60 are located in front of the boss sleeve 56 and between the boss sleeve 56 and the second gear 54. The front clutch 59 and the rear clutch 60 are spline-connected to the countershaft 49 in an axially slidable manner. The front clutch 59 engages with the second gear 54 at an advanced position. The front clutch 59 is separate from the second gear 54 at a retracted position. The rear clutch 60 engages with the boss sleeve 56 at a retracted position. The rear clutch 60 is separate from the boss sleeve 56 at an advanced position. Each of the front clutch 59 and the rear clutch 60 engages with the corresponding switch plate 61 located in the front housing 41 in a manner movable back and forth. A switch lever 62 on the lower surface of the front housing 41 is operable to slide the switch plates 61, allowing each of the front clutch 59 and the rear clutch 60 to be slid to a position selected externally.

The tool holder 50 accommodates a piston cylinder 65 in a reciprocable manner. The piston cylinder 65 has its rear end connected to the arm 58. The piston cylinder 65 accommodates a striker 67 with an air chamber 66 in between in a reciprocable manner. In front of the striker 67, the tool holder 50 includes an impact bolt 68. The tool holder 50 protruding from the front cylinder 47 receives a chuck 69 at its distal end. The chuck 69 holds the bit B (drill bit in FIG. 1). The chuck 69 receives an operation sleeve 70 operable to attach or detach the bit B.

In the hammer drill 40, a trigger 71 on the handle 43 is pressed to drive the motor 44. The rotation of the output shaft 45 is transmitted to the first gear 52, rotating the countershaft 49. In this state, the hammer drill 40 is in a drill mode in response to the advanced position being selected, at which the front clutch 59 engages with the second gear 54, and to the advanced position being selected, at which the rear clutch 60 is separate from the boss sleeve 56. In the drill mode, the second gear 54 alone is rotated to rotate the tool holder 50 through the third gear 55. The hammer drill 40 is in a hammer drill mode in response to the advanced position being selected for the front clutch 59, and to the retracted position being selected, at which the rear clutch 60 engages with the boss sleeve 56. In the hammer drill mode, the boss sleeve 56 is rotated together with the second gear 54 to swing the arm 58 back and forth through the swash bearing 57. The piston cylinder 65 thus reciprocates together with the striker 67 to strike the bit B with the impact bolt 68. The hammer drill 40 is in a hammer mode in response to the retracted position being selected for the front clutch 59, and to the retracted position being selected for the rear clutch 60. In the hammer mode, the boss sleeve 56 alone is rotated to swing the arm 58 back and forth, reciprocating the piston cylinder 65 to strike the bit B.

As shown in FIGS. 4 and 5, the front cylinder 47 in the front housing 41 includes a larger-diameter portion 75 on its front outer surface. The rear end of the attachment 2 is externally mounted on the larger-diameter portion 75. The larger-diameter portion 75 includes eight cut portions 76 at equal intervals in the circumferential direction. Each cut portion 76 is long enough to allow a pair of protrusions 4 on the inner circumference at the rear end of the attachment 2 to pass through it in the front-rear direction. Eight engagement recesses 77 are located on the outer circumferential surface of the front cylinder 47 and behind the larger-diameter portion 75. Each engagement recess 77 connects with the rear end of the corresponding cut portion 76. Each engagement recess 77 is longer in the clockwise direction than the cut portion 76 as viewed from the front. Each pair of protrusions 4 having passed the corresponding cut portion 76 is placed in the corresponding engagement recess 77, and is movable in the circumferential direction.

For using the dust collection cup 1, as shown in FIGS. 9A and 9B, the attachment 2 is placed on the front cylinder 47 from the front with the pairs of protrusions 4 aligned with the intended cut portions 76 in the circumferential direction. As shown in FIGS. 10A and 10B, each protrusion 4 passes through the corresponding cut portion 76 and is placed in the corresponding engagement recess 77. The attachment 2 is then rotated clockwise as viewed from the front. This causes each protrusion 4 to move to behind the larger-diameter portion 75 as shown in FIGS. 3A and 3B, thus preventing the attachment 2 from slipping off forward. In this manner, the attachment 2 is bayonet-connected to the front cylinder 47.

In this state, the bit B is placed into the dust collection cup 1 through the rear end to extend through the through-hole 11 in the seal plate 8. The bit B is thus attached to the chuck 69. The operation sleeve 70 is operable through the windows 6 in the attachment 2. The attached bit B is coaxially surrounded by the bellows 25 in the dust collector 3. A space around the bit B in the bellows 25 connects with a front space located in front of the seal plate 8 and surrounded by the front receivers 12. The front space connects with the holder 15, the sealing portion 16, and the connection port 17 through the spaces between the front receivers 12 as described above.

To perform drilling on a workpiece with the dust collection cup 1 and the hammer drill 40, the dust collector 3 is pressed against the workpiece to contract the bellows 25. The distal end of the bit B is then placed at a drilling target position. In this state, the hammer drill 40 operated in the drill mode or in the hammer drill mode rotates the bit B to drill a hole in the workpiece. As the bit B drills the hole, the bellows 25 contracts, thus allowing the hammer drill 40 and the attachment 2 to move forward. With the bellows 25 having its rear end in contact with the four front receivers 12 in the attachment 2, the four front receivers 12 evenly receive a repulsive force generated by compression. The bellows 25 is thus less likely to be tilted with respect to the bit B and is compressed linearly in the direction of the axis A3.

Dust produced from drilling the workpiece is stored in the bellows 25. When an external dust collection device is not used, the cylindrical portion 18 covered with a stopper 29 prevents the dust stored in the bellows 25 from leaking from the cylindrical portion 18. Once the operation is complete, the stopper 29 is removed, and the dust is discharged through the cylindrical portion 18 or through the front end of the bellows 25.

Figure 11B:
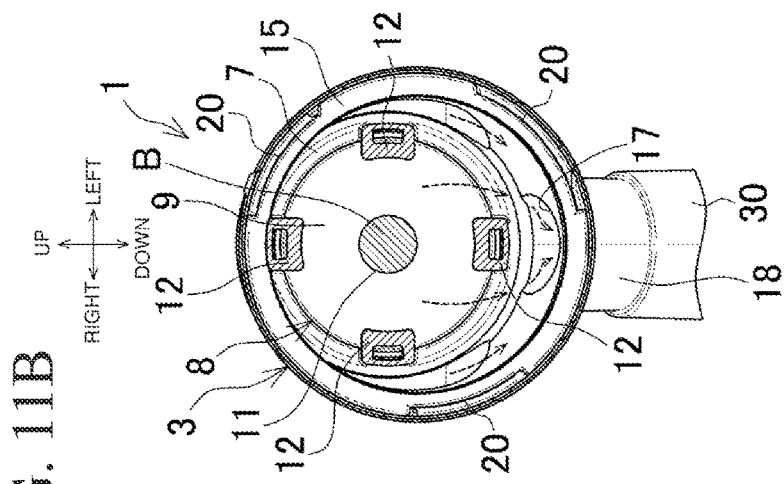
FIG. 11B is a cross-sectional view taken along line G-G in FIG. 11A.
Figure 11A:
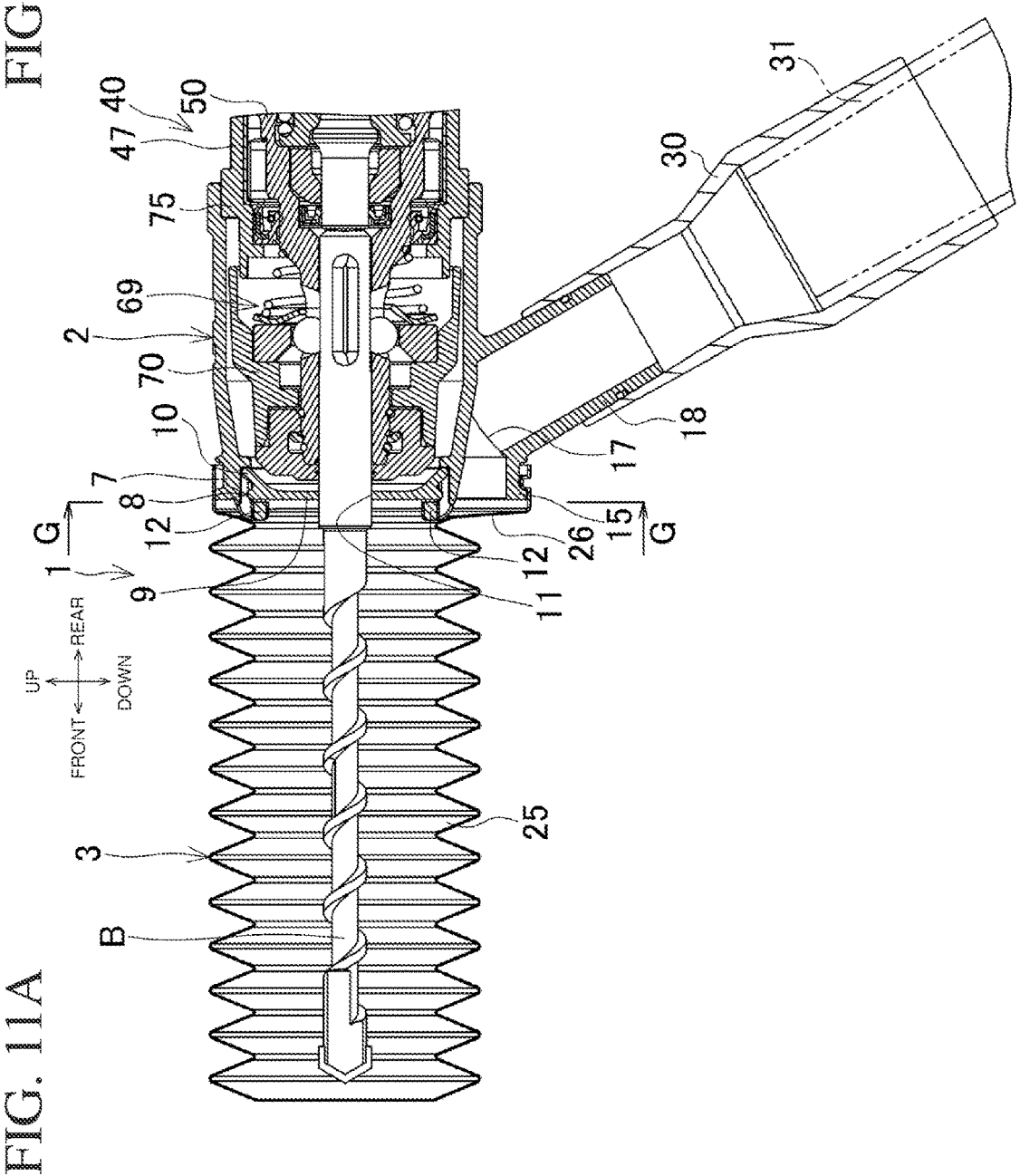
FIG. 11A is an enlarged longitudinal central sectional view of the hammer drill, showing its front portion with the dust collection cup connected to a flexible hose.

When an external dust collection device is used, a cylindrical adapter 30, in place of the stopper, is connected to the cylindrical portion 18 as shown in FIGS. 11A and 11B. The adapter 30 is then connected to a flexible hose 31 in the external dust collection device. When the dust collection device is operated, dust is produced and flows with air from the dust collector 3 and through the holder 15, the sealing portion 16, the connection port 17, and the cylindrical portion 18 in the attachment 2. The dust is then drawn by the dust collection device through the adapter 30 and the flexible hose 31. Thus, dust is discharged effectively while the drilling operation is being performed.

In this state, the front receivers 12 define the clearance (air passages) between the front surface of the seal plate 8 and the rear end opening of the bellows 25. Air drawn from the dust collector 3 thus smoothly flows outside and between the front receivers 12 toward the connection port 17 as indicated by dotted lines in FIG. 11B.

In the dust collection cup 1 and the hammer drill 40 according to the present embodiment, the connection port 17 for the flexible hose 31 (dust collection hose) is located on the outer circumferential surface of the attachment 2. The connection port 17 is located in the radial direction of the bit B outward from the seal plate 8 (seal) and rearward from the seal plate 8 (seal).

The connection port 17 has the distance D1 in the radial direction from the axis A1 of the attachment 2 to the point P1 (outermost position) longer than the distance D2 in the radial direction from the axis A1 to the point P2 on the outer circumferential surface of the attachment 2. The point P2 on the outer circumferential surface of the attachment 2 is opposite from the axis A1.

In this structure, the connection port 17 alone can be located away from the axis A1 of the attachment 2. The bellows 25 in the dust collector 3 can thus be shaped in conformance with the attachment 2 excluding a portion including the connection port 17. The structure including the connection port 17 can downsize the dust collector 3 and can improve viewability.

The dust collector 3 is attachable to and detachable from the attachment 2. The dust collector 3 is thus easily replaceable when damaged. Multiple dust collectors 3 with different shapes for different operations may be prepared to allow easy selection of a dust collector 3.

The attachment 2 and the dust collector 3 have a circular cross section. The holder 15 and the sealing portion 16 (a portion including the connection port 17) in the attachment 2 are decentered from the axis A1 toward the connection port 17. The connection port 17 alone can thus be easily located apart from the axis A1 of the attachment 2.

The attachment 2 and the dust collector 3 are bayonet-connected to each other and are urged against each other in the directions in which the attachment 2 and the dust collector 3 are connected to each other. This facilitates attachment and detachment of the dust collector 3 and maintains their stable connection.

The attachment 2 includes the front receivers 12 (receiver) in contact with the circumference of the rear end opening of the bellows 25 in the dust collector 3 to support the bellows 25 evenly in the circumferential direction. The bellows 25 in use can thus receive a pressure load applied in the direction of the axis A3 and is less likely to be tilted. The front receivers 12 also reliably define the air passages.

The front receivers 12 also position the seal plate 8. This structure appropriately includes fewer components.

The attachment 2 is attachable to and detachable from the hammer drill 40 with the bayonet connection. This allows easy selection of an intended dust collection cup 1. The attachment 2 is attachable to the hammer drill 40 at multiple selectable positions about the axis of the bit B. The hammer drill 40 is thus usable with the connection port 17 having the orientation selected for an operation.

Modifications of the present disclosure will now be described.

In the bayonet connection between the attachment and the dust collector in the dust collection cup, the numbers of ridges and engaging recesses and their shapes are not limited to the numbers and the shapes in the above embodiment. The ridges and the engaging recesses may be replaced with each other. The ridges may be located on the attachment. The engaging recesses may be located on the dust collector. The holder may be externally mounted on the cap. In this case, the holder includes ridges or engaging recesses on its inner circumferential surface, and the cap includes engaging recesses or ridges on its outer circumferential surface.

Protrusions that are not elongated in the circumferential direction may be located in place of the ridges. L-shaped slits may be located in place of the engaging recesses.

The attachment and the dust collector may have any cross section other than a circular cross section. The holder and the cap may have, for example, an oval cross section, and may include the connection port at a decentered position of the oval cross section. The holder and the cap may be polygonal rather than oval.

The attachment and the dust collector may be connected to each other with a structure other than the bayonet connection. For example, one of the attachment or the dust collector may have tabs or other engaging portions, and the other may have recesses, holes, or other receiving portions. These engaging portions and receiving portions may be engaged with each other in the axial direction to achieve the connection. The attachment may be connected to the dust collector with simple fitting (press-fitting) between their openings.

The connection port in the attachment may not be open diagonally rearward as in the above embodiment. The connection port may be open with its axis aligned with the radial direction of the attachment. The cylindrical portion may be eliminated.

In the bayonet connection between the attachment and the front cylinder in the power tool, the numbers of protrusions and engagement recesses and their shapes are not limited to the numbers and the shapes in the above embodiment. The protrusions and the engagement recesses may be replaced with each other. The protrusions may be located on the front cylinder. The engagement recesses may be located on the attachment.

Ridges elongated in the circumferential direction may be located in place of the protrusions. L-shaped slits may be located in place of the engagement recesses.

The attachment and the front cylinder may be connected to each other through a structure other than the bayonet connection. For example, one of the attachment or the front cylinder may have tabs or other engaging portions, and the other may have recesses, holes, or other receiving portions. These engaging portions and receiving portions may be engaged with or disengaged from each other in the axial direction. The attachment may be simply fitted to the front cylinder.

The dust collector may be integral with the attachment, rather than being attachable to and detachable from the attachment.

Figure 12:
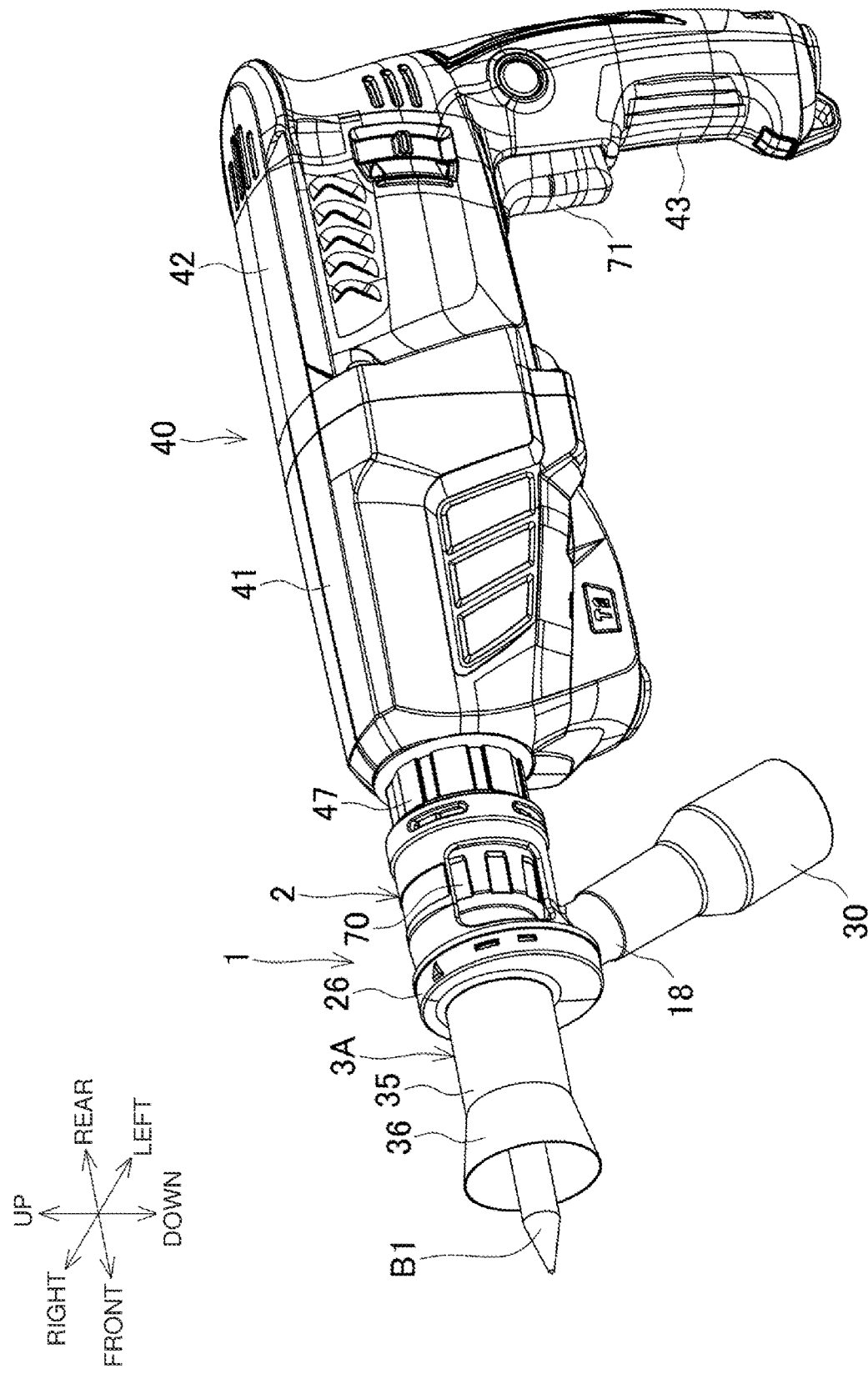
FIG. 12 is a perspective view of a hammer drill with a dust collection cup according to a modification.

The dust collector may not be limited to the structure including the bellows as in the above embodiment. FIGS. 12, 13A, and 13B show an example of the hammer drill 40 with a bit B1 for chipping. In this example, a dust collector 3A in the dust collection cup 1 includes a cylindrical portion 35 that is not a bellows. The front receivers 12 receive a rear end opening of the cylindrical portion 35. The cylindrical portion 35 includes its front portion as a flared portion 36 that flares toward the front. The other components are the same as the components described in the above embodiment.

When such a dust collector 3A in a different type is prepared, the dust collector 3 can be exchanged with the dust collector 3A depending on the operation.

The power tool is not limited to the hammer drill as in the above embodiment. The power tool may be a hammer drill including a crank assembly as a rotation-striking assembly, or may be an electric drill without a striking assembly. In other words, the present disclosure is applicable to any power tool to which the dust collection cup according to one or more embodiments of the present disclosure is attachable to the front cylinder located at the front end of the housing.

REFERENCE SIGNS LIST 1 dust collection cup
2 attachment
3, 3A dust collector
4 protrusion
7 front end
8 seal plate
9 disk
10 sloped portion
11 through-hole
12 front receiver
13 rear receiver
15 holder
16 sealing portion
17 connection port
18 cylindrical portion
19 engaging recess
20 cutout
21 inner protrusion
25 bellows
26 cap
27 ridge
28 outer protrusion
30 adapter
31 flexible hose
35 cylindrical portion
40 hammer drill
41 front housing
42 rear housing
44 motor
45 output shaft
46 rotation-striking assembly
47 front cylinder
48 inner housing
49 countershaft
50 tool holder
65 piston cylinder
67 striker
68 impact bolt
75 larger-diameter portion
76 cut portion
77 engagement recess
A1 axis of attachment
A2 axis of holder
A3 axis of bellows
A4 axis of cap

What is claimed is:
1. A dust collection cup, comprising:
an attachment being cylindrical and attachable to a power tool, the attachment being attached to cause a bit attached to the power tool to extend through the attachment, the attachment having a circular cross section centered at a first center axis;
a dust collector being cylindrical and located in front of the attachment to cause the bit to extend through the dust collector, the dust collector being attachable to and detachable from the attachment, the dust collector having a circular cross section centered at a second center axis, the dust collector having a smaller diameter than the attachment; and
a seal between the attachment and the dust collector, the seal having a through-hole to receive the bit, wherein:
the attachment has a connection port on an outer circumferential surface,
the connection port is outward in a radial direction of the bit from the seal and rearward from the seal,
the connection port is connectable to a dust collection hose, and
the first center axis is located toward the connection port from the second center axis.
2. The dust collection cup according to claim 1, wherein the attachment and the dust collector are bayonet-connected to each other and are urged against each other in directions in which the attachment and the dust collector are connected to each other.
3. The dust collection cup according to claim 2, wherein the attachment includes a receiver in contact with a circumference of a rear end opening of the dust col- lector to support the dust collector evenly in a circumferential direction of the dust collector.

4. The dust collection cup according to claim 2, wherein the attachment is attachable to and detachable from the power tool with bayonet connection.

5. The dust collection cup according to claim 1, wherein the attachment includes a receiver in contact with a circumference of a rear end opening of the dust collector to support the dust collector evenly in a circumferential direction of the dust collector.

6. The dust collection cup according to claim 5, wherein the receiver positions the seal.

7. The dust collection cup according to claim 6, wherein the attachment is attachable to and detachable from the power tool with bayonet connection.

8. The dust collection cup according to claim 5, wherein the attachment is attachable to and detachable from the power tool with bayonet connection.

9. The dust collection cup according to claim 1, wherein the attachment is attachable to and detachable from the power tool with bayonet connection.

10. The dust collection cup according to claim 9, wherein the attachment is attachable to the power tool at a plurality of selectable positions about an axis of the bit.

11. A power tool, comprising:
a bit; and
the dust collection cup according to claim 1, the dust collection cup being attachable to a front end to receive the bit.

* * * * *